US012655305B2

(12) United States Patent
Hasheminasab et al.

(10) Patent No.: US 12,655,305 B2
(45) Date of Patent: Jun. 16, 2026

(54) WATER-BASED ELASTOMERIC COATING FORMULATION METHOD AND ELASTOMERIC COATING FORMED USING SAME

(71) Applicant: Wolverine Advanced Materials, LLC, Dearborn, MI (US)

(72) Inventors: Abed Hasheminasab, Dearborn, MI (US); Bryan Grace, Dearborn, MI (US); Drew Zawacki, Waterford Township, MI (US)

(73) Assignee: Wolverine Advanced Materials, LLC

( * ) Notice: Subject to any disclaimer, the term of this patent is extended or adjusted under 35 U.S.C. 154(b) by 523 days.

(21) Appl. No.: 18/117,159

(22) Filed: Mar. 3, 2023

(65) Prior Publication Data

US 2024/0294772 A1 Sep. 5, 2024

(51) Int. Cl.

| | |
|---|---|
| ***C09D 5/00*** | (2006.01) |
| ***C08K 3/04*** | (2006.01) |
| ***C09D 5/02*** | (2006.01) |
| ***C09D 7/20*** | (2018.01) |
| ***C09D 7/40*** | (2018.01) |

(Continued)

(52) U.S. Cl.

CPC ............. *C09D 5/022* (2013.01); *C09D 5/021* (2013.01); *C09D 5/027* (2013.01); *C09D 5/028* (2013.01); *C09D 7/20* (2018.01); *C09D 7/45* (2018.01); *C09D 7/61* (2018.01); *C09D 121/02* (2013.01); *C08K 3/04* (2013.01)

(58) Field of Classification Search

CPC ........ C09D 5/022; C09D 5/021; C09D 5/028; C09D 7/20; C09D 7/45; C09D 7/61; C09D 121/02; C09D 5/027; C08K 3/04

See application file for complete search history.

(56) References Cited

U.S. PATENT DOCUMENTS 3,857,915 A * 12/1974 Crowley .................... C08J 9/06 427/256
5,314,741 A * 5/1994 Roberts .................. C08J 7/0427 428/521

(Continued)

FOREIGN PATENT DOCUMENTS

GB 999061 A * 7/1965 ............... B05D 5/06

OTHER PUBLICATIONS

International Search Report and Written Opinion received in PCT Application No. PCT/US2024/016953 as mailed Aug. 9, 2024 in 27 pages.

(Continued)

*Primary Examiner* — Anthony J Green
*Assistant Examiner* — Anastasia A. Kuvayskaya
(74) *Attorney, Agent, or Firm* — Honigman LLP

(57) ABSTRACT

The disclosed technology generally relates to methods of forming foamed and non-foamed aqueous rubbers for use in automotive applications and which are configured to provide vibration and noise damping. In one aspect, a method of forming an elastomer comprises forming a latex solution and then curing the latex solution. Forming the latex solution comprises forming a medium by mixing water and ethylene glycol monobutyl ether (glycol ether EB) and then adding to the medium a rheology modifier, a dispersing agent, a wetting agent, a filler material, and a latex suspension. Water makes up 50-90 wt. % of the latex solution.

14 Claims, 6 Drawing Sheets

(51) Int. Cl.

| | |
|---|---|
| ***C09D 7/45*** | (2018.01) |
| ***C09D 7/61*** | (2018.01) |
| ***C09D 121/02*** | (2006.01) |

(56) References Cited

U.S. PATENT DOCUMENTS

| | | | | |
|---|---|---|---|---|
| 2010/0183863 | A1 | 7/2010 | Linnenbrink et al. | |
| 2012/0082791 | A1* | 4/2012 | Liversage ............ | C09D 133/08<br>524/565 |

OTHER PUBLICATIONS

Qamarina et al., "Zinc-Complexes in Natural Rubber Latex Sulphur Vulcanisation System," Journal of Rubber Research, vol. 12(2), Jan. 2009, pp. 80-92.

* cited by examiner

WATER-BASED ELASTOMERIC COATING FORMULATION METHOD AND ELASTOMERIC COATING FORMED USING SAME

BACKGROUND

Field

The disclosed technology relates generally to manufacturing rubber coatings and more particularly to manufacturing rubber coatings using water-based formulations.

Description of the Related Art

Rubber-based composites are used in a wide variety of automotive applications. They are often used as gaskets in fluid-sealing applications. They are also used as noise, vibration and heat insulators in a variety of applications, such as brake shims for brake rotor and pad systems. In some applications, the rubber used in the rubber-based composites is solvated using volatile organic compounds (VOCs), which can be toxic to humans and harmful to the environment. Accordingly, there remains a need for rubber-based composites that are formed using a reduced amount of VOCs during the solvation process and less hazardous curatives during the vulcanization process.

SUMMARY

In an aspect, a method of forming an elastomer. The method comprises forming a latex solution and then curing the latex solution. Forming the latex solution comprises forming a medium by mixing water and ethylene glycol monobutyl ether (glycol ether EB) and then adding to the medium a rheology modifier, a dispersing agent, a wetting agent, a filler material, and a latex suspension. Water makes up 50-90 wt. % of the latex solution.

In another aspect, a method of forming an elastomer coating. The method comprises providing a substrate, forming a latex solution, adding a cure package to the latex solution, coating the substrate with the latex solution, and then heating the coated substrate to cure the latex solution. The latex solution comprises 20-70 wt. % latex suspension, 5-30 wt. % glycol ether EB, 1-15 wt. % rheology modifier, 0.1-2 wt. % dispersing agent, 0.1-2 wt. % wetting agent, 1-15 wt. % carbon black, and 50-90 wt. % of water.

In another aspect, an apparatus comprises a substrate and a rubber coating formed on the substrate. The rubber coating comprises vulcanized latex and carbon black.

In another aspect, a method of forming an elastomer coating. The method comprises forming a latex solution, adding a cure package to the latex solution, and the heating the latex solution to cure the latex solution. The latex solution comprises 20-70 wt. % latex suspension, 5-30 wt. % glycol ether EB, 1-15 wt. % rheology modifier, 0.1-2 wt. % dispersing agent, 0.1-2 wt. % wetting agent, 1-15 wt. % carbon black, and 50-90 wt. % water. The cure package does not comprise a volatile organic compound.

DETAILED DESCRIPTION

To address the above-indicated needs, among others, embodiments are directed to forming rubber-based composites using a water-based medium, with reduced amounts of VOCs such as toluene, xylene, acetonitrile, tetrahydrofuran, dimethyl sulfoxide, methanol, and ethanol, e.g., during the solvation process. Further, the method uses less hazardous curatives during the vulcanization process such as isocyanates.

Figure 1:
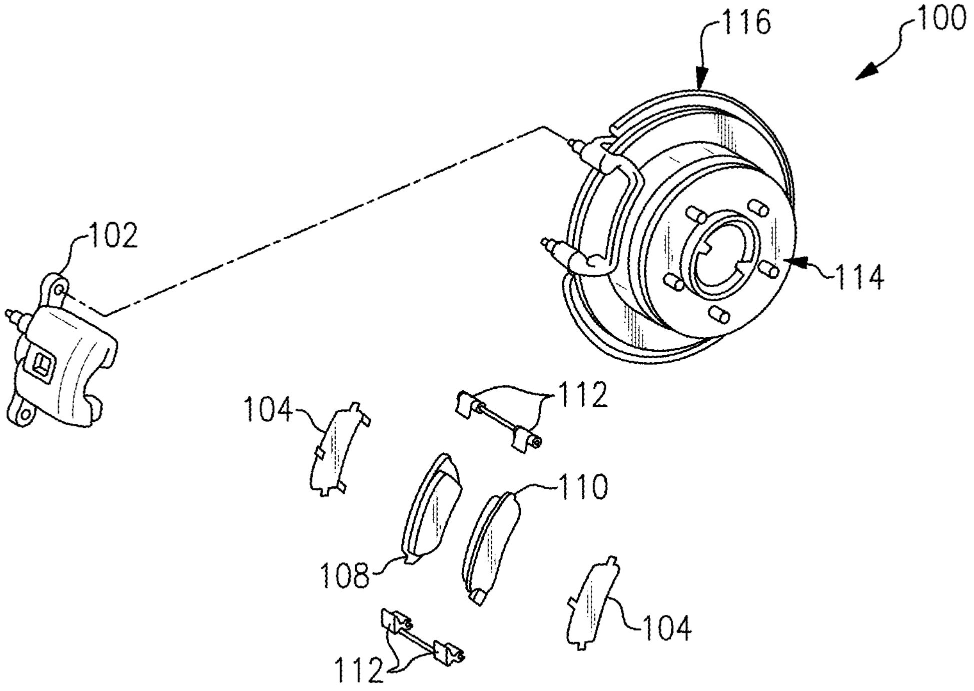
FIG. 1 schematically illustrates a brake disc assembly having brake shims, according to embodiments of the present technology.

FIG. 1 illustrates an example application of a foamed or non-foamed rubber coating formed using an aqueous formulation according to embodiments. In particular, FIG. 1 illustrates a brake disc assembly having a brake disc rotor and a corresponding pair of brake pads arranged according to aspects of the present disclosure. The example brake disc assembly 100 includes a caliper 102, a pair of brake shims 104, an inner brake pad 108, an outer brake pad 110, abutment clips 112, a hub 114, and a brake disc rotor 116. The hub 114 may be mounted on an axle (not shown). The brake disc rotor 116 has a disc shape and is a part of the hub 114. The brake disc rotor 116 is configured to rotate along with the hub 114 through the axle. When pressure is applied to a brake pedal of a vehicle, various systems in the vehicle will responsively actuate the caliper 102 to urge the surface of the inner and outer brake pads 108, 110 against a surface of the brake disc rotor 116, thus bringing the vehicle to a halt. The brake shims 104 are positioned between the brake pads 108, 110 and the caliper 102 such that, when pressure is applied to the brake pedal, the calipers push on the brake shims 104, which then push on the brake pads 108, 110. The brake shims 104 are configured to absorb impacts on the brake pads 108, 110 caused by the brake pads 108, 110 contacting the brake disc rotor 116 during the braking process such that the brake pads 108, 110 do not contact the caliper 102. As described in greater detail elsewhere in the application, the shims 104 are formed from a thin piece of metal that may be coated with an elastomer layer according to various embodiments disclosed herein. In this way, the brake shims 104 can reduce noise and vibration noise that may occur during brake application when the brake pads 108, 110 contact the brake disc rotor 116.

Figure 2:
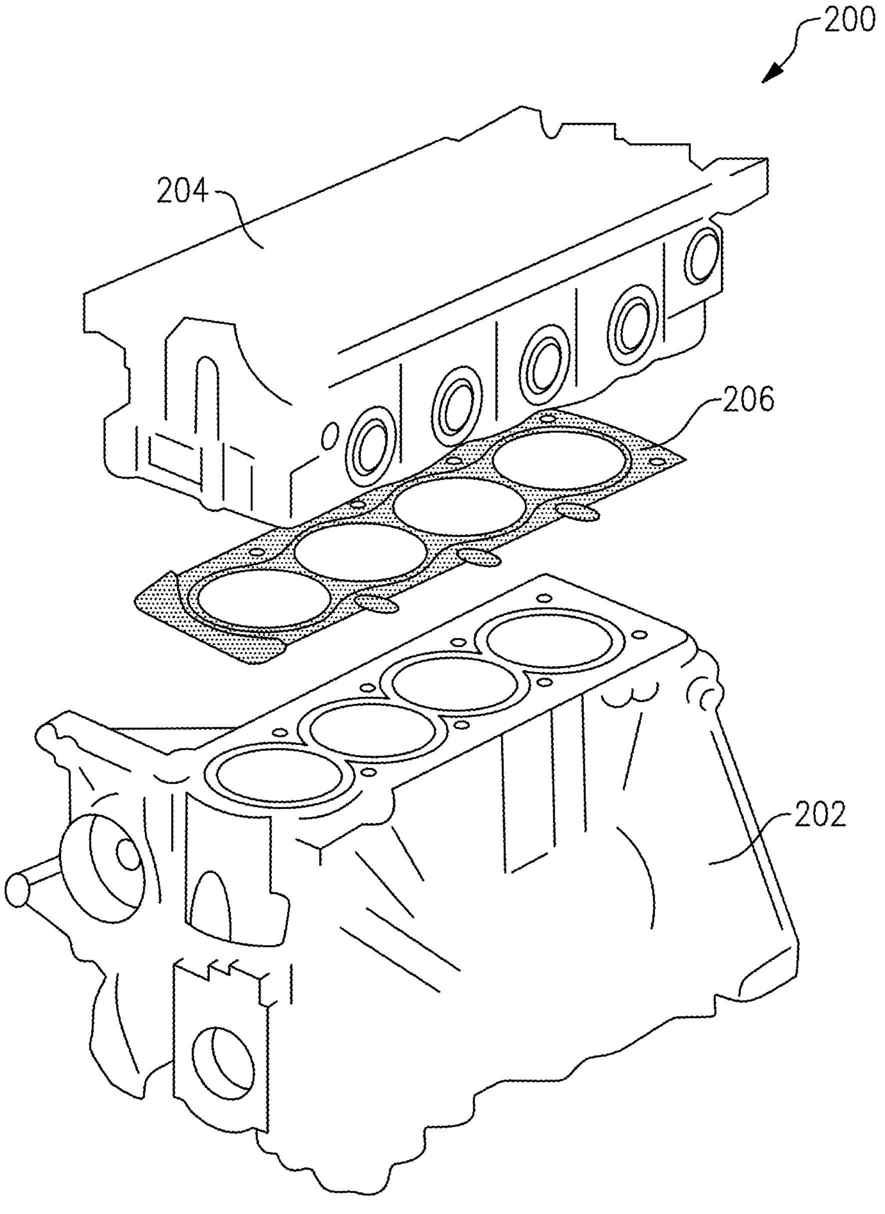
FIG. 2 schematically illustrates an engine having a gasket, according to embodiments of the present technology.

FIG. 2 illustrates another example application of a rubber coating formed using aqueous formulation according to embodiments. In particular, FIG. 2 illustrates internal combustion engine 200 used in automotive applications. The engine 200 includes an engine block 202, a cylinder head 204, and a gasket 206. The engine block 202 and cylinder head 204 each include various fluid passages and the engine block 202 and cylinder head 204 are aligned such that the fluid passages within the cylinder head 204 are in fluid connection with corresponding fluid passages in the engine block 202. For example, the engine block 202 and cylinder head 204 each include coolant and oil passages and the engine block 202 and cylinder head 204 are aligned such that coolant passages within the engine block 202 are in fluid connection with coolant passages within the cylinder head 204 while oil passages within the engine block 202 are in fluid connection within the cylinder head 204. The engine block 202, cylinder head 204, and gasket 206 are secured together (e.g., with bolts that extend through the engine block 202, cylinder head 204, and gasket 206) such that the gasket 206 is securely positioned between the engine block 202 and the cylinder head 204. The gasket 206 includes a plurality of openings that correspond to the various fluid passages within the engine block 202 and cylinder head 204 to allow for the fluids to move between the engine block 202 and cylinder head 204. The gasket 206 is configured to form a seal between the engine block 202 and cylinder head 204 so that the fluids flowing through the various passages between the engine block 202 and the cylinder head 204 remain in their respective passages and do not leak into adjacent passages or out of the engine 200. The gasket 206 also prevents fluids from leaking into the cylinders where combustion takes place, prevents fuel/air from the cylinders from leaking into the fluid passages, and prevents fuel/air from one cylinder from leaking into an adjacent cylinder. Fluid leaks in an engine can reduce the performance of the engine and can even cause damage to the engine.

As described in greater detail elsewhere in the application, the gasket 206 is formed from a thin piece of metal coated with an elastomer layer according to various embodiments disclosed herein. In some embodiments, the elastomer layer is a foamed or non-foamed elastomer that is configured to be compressed between the engine block 202 and the cylinder head 204. In the illustrated embodiment, the gasket 206 is a head gasket configured to be positioned between the engine block 202 and the cylinder head 204. In other embodiments, however, the gasket 206 can be another type of gasket used in engine 206. For example, in some embodiments, the gasket 206 can be a valve cover gasket, an exhaust manifold gasket, or an intake manifold gasket. In still other embodiments, the gasket 206 can configured to be used in other automotive systems, such as exhaust systems, transmission systems, or fuel pump systems. In still other embodiment, the gasket 206 is configured to be in a non-automotive application, such as in power generation systems, aeronautical systems, or nautical systems. In general, the gasket 206 can be used in any application where a tight seal is needed to prevent leaks.

Figure 3:
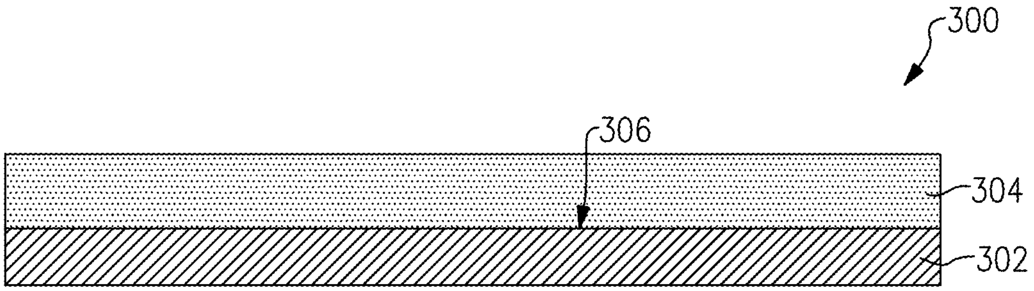
FIG. 3 illustrates a side sectional view of a coated article according to embodiments of the present technology.

FIG. 3 is a side sectional view of a coated article 300. The coated article 300 comprises a substrate 302 having formed thereon an elastomer layer 304. The substrate 302 is configured to provide structure for the coated article 300 and to support the elastomer layer 304. In some embodiments, the substrate 302 is formed from metal. For example, in some embodiments, the substrate 302 comprises a stainless steel, cold rolled steel, galvanized steel, or aluminum. In other embodiments, however, the substrate 302 is formed from a different material. For example, in some embodiments, the substrate 302 is formed from a non-metallic material such as a plastic, ceramic, glass, or textile material.

The elastomer layer 304 is formed on a surface 306 of the substrate 302 and is formed from a vulcanized elastomer latex solution that is configured to be elastically deformable such that it is compressible. In some embodiments, the elastomer 304 layer comprises natural rubber (NR), carboxylated acrylonitrile butadiene rubber (XNBR), fluorinated rubber (FKM), or ethylene propylene diene monomer rubber (EPDM). In other embodiments, however, the elastomer layer 304 is comprises a different type of rubber. As described elsewhere in the specification, the elastomer layer 304 is formed by coating the surface 306 of the substrate 302 with an uncured (or only-partially cured) water-reducible, latex solution and then drying and fully curing the latex solution. During the drying and curing process, which is typically referred to as vulcanization, cross-linking between the long-chain polymer molecules in the latex solution occurs, which causes the fluid latex solution to harden and stiffen and the strength of the latex to increase. The resulting solid material is relatively tough and durable while still being sufficiently flexible over a wide temperature range. The vulcanized latex material is also able to withstand environments typically seen in sealing and brake applications. For example, the vulcanized latex material is capable of maintaining its flexibility and toughness even when exposed to high pressures and/or elevated temperatures. Additionally, the material is chemically stable and unreactive and maintains its flexibility and toughness even after being exposed to fluids commonly found in automobile applications, such as motor oils, greases, transmission fluids, brake fluids, coolants, etc. In this way, the elastomer layer 304 provides, among other advantages, sufficient vibration and noise damping when the coated article 300 is used in braking applications and is sufficiently compressible to form a seal when the coated article 300 is used in sealing applications.

The elastomer layer 304 can be formed in a range of thicknesses, e.g., by controlling the viscosity, the solids content, and the blade gap. For example, in some embodiments, the elastomer layer 304 can have a thickness of 0.01 mm, 0.05 mm, 0.1 mm, 0.15 mm, or a value in a range defined by any of these values. In some embodiments, the thickness of the elastomer layer 304 can vary based on the specific application that the coated article 300 is intended to be used for. For example, in embodiments where the coated article 300 is a brake shim intended to be used in braking applications, the thickness of the elastomer layer 304 can vary depending on the type of car that the brake shim is intended to be used in. For example, in embodiments where the brake shim is intended to be used in a high-performance car or an off-road car, the elastomer layer 304 can be thicker than in embodiments where the brake shim is intended to be used in a less powerful car. This is because the high-performance sports car or off-road car can require more noise and vibration damping than the less powerful car, so a thicker elastomer layer 304 is desirable. Similarly, in embodiments where the coated article 300 is a gasket intended to be used in sealing applications, the thickness of the elastomer layer 304 can be dependent on the type of gasket and where the gasket is being used. For example, in embodiments where the gasket is intended to be used in environments that experience high vibrations (e.g., the head gasket for a high-powered automobile), a thicker elastomer layer 304 can be used to ensure that the vibrations do not cause the seal formed by the gasket to break.

In some embodiments, the composition and structure of the elastomer layer 304 can also vary based on the specific application that the coated article 300 is intended to be used for. For example, in embodiments where less vibration or noise damping is needed, the elastomer layer 304 can be formed from a stiffer and/or denser elastomer material that does not compress or deform as easily. In embodiments where more vibration or noise damping is needed, the elastomer layer 304 can be formed from a more flexible and/or less dense elastomer material that elastically deforms more easily.

To adjust the final mechanical properties of the elastomer layer 304, the type and quantity of the reinforcing filler material included in the latex solution can be adjusted and carefully selected. Specifically, the type of filler material used, the structure of the filler material, and the amount of filler added to the latex solution can all be varied to achieve the desired mechanical properties of the elastomer layer 304. Many types of filler materials are used in elastomers, and examples of common filler materials include, but are not limited to, carbon black, silicon dioxide, titanium dioxide, aluminum dioxide, kaolin clay, etc. Filler structure plays an important role in determination of the final mechanical properties of the elastomer layer. For example, filler materials having a highly aggregated and smaller structure will provide higher tensile strengths and stiffness while filler materials having a less aggregated and larger structure will impart better flexibility and elongation. The filler loading amount, which relates to the amount of filler present in the elastomer layer, can also be adjusted to tune the flexibility, stiffness, and hardness of the elastomer layer.

In still other embodiments, the elastomer layer 304 can be formed from a compressible elastomer material. For example, in embodiments where the coated article 300 is configured to be used in a sealing application, the elastomer layer 304 can be formed from a foamed elastomer. A foamed elastomer is an elastomer comprising a cellular structure. To form the foamed structure, one or more blowing agents can be added to the latex solution. Typical blowing agents include di(isononyl) cyclohexane-1,2-dicarboxylate ("DINCH"), thermo-expandable microspheres, azodicarbonamide, and sodium bicarbonate. The blowing agents are configured to thermally degrade when heated during the vulcanization process. As the blowing agents degrade, they release a gas that is then captured by the elastomer material to form the cellular structure. The decomposition temperature needs to be high enough to ensure effective evaporation of water from the elastomeric composite, but lower than the vulcanization temperature to ensure proper formation of the cellular structure. The resulting foamed elastomer material has a porous, foam-like structure which causes the foamed elastomer to be generally more compressible than the un-foamed elastomers. In some embodiments, a mechanical agent is used to create the foamed structure. Advantageously, forming the elastomer layer 304 from a foamed elastomer material improves the sealing ability of the coated article 300 when the coated article 300 is used in sealing applications.

In some embodiments, the foamed elastomer comprises 85 vol % of air and 15 vol % of latex material. In other embodiments, however, the foamed elastomer comprises a different amount of air and latex material. For example, in some embodiments, the foamed elastomer can comprise 50 vol % air and 50 vol % latex material, 60 vol % air and 40 vol % latex material, 70 vol % air and 30 vol % latex material, 80 vol % air and 20 vol % latex material, 90 vol % air and 10 vol % latex material, or a value in a range defined by any of these values.

In embodiments of the coated article 300 having an elastomer layer 304 formed form a foamed elastomer, the thickness of the elastomer layer 304 can be larger. For example, in some embodiments, the foamed elastomer layer 304 can have a thickness of 0.04 mm, 0.06 mm, 0.08 mm, 0.1 mm, 0.2 mm, 0.3 mm, 0.4 mm, 0.5 mm, greater than 0.5 mm, or a value in a range defined by any of these values.

In the illustrated embodiment, for illustrative purposes, the coated article 300 is shown as only including the substrate 302 and the elastomer layer 304. Embodiments are not so limited, and in other embodiments, however, the coated article 300 can include one or more additional layers. For example, in some embodiments, the coated article can include a pretreatment layer and/or primer layer formed on the surface 306. The pretreatment layer and/or primer layer is configured to modify the surface 306 to enhance adhesion of the elastomer layer 304, e.g., by increasing the strength of the bond between the elastomer layer 304 and the surface 306 of the substrate 302 so that the elastomer layer 304 remains adhered to the substrate 302. In some embodiments, the coated article 300 can include one or more additional elastomer layers formed on the elastomer layer 304. In embodiments where the coated article is configured to be used in braking applications, the coated article 300 can include an adhesive layer formed on a surface 308 of the elastomer layer 304. The adhesive layer can be configured to be in contact with a brake pad (e.g., brake pads 108, 110 shown in FIG. 1) to ensure that the coated article 300 remains attached to the brake pads during operation and to help ensure that the coated article 300 and/or the brake pads remain properly positioned within the brake caliper (e.g., brake caliper 102).

Figure 4:
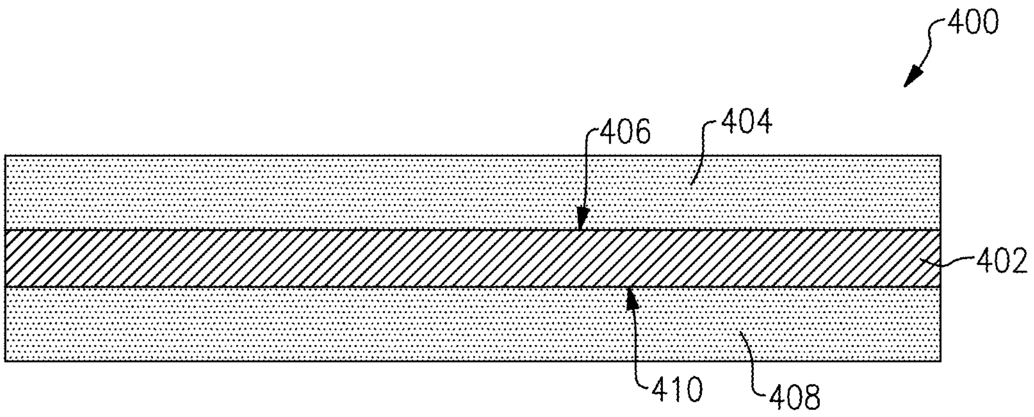
FIG. 4 illustrates a side sectional view of a coated article according to embodiments of the present technology.

Still referring to FIG. 3, in the illustrated embodiment, the coated article 300 includes an elastomer layer 304 formed on a single side of the substrate 302. In other embodiments, however, the coated article can include elastomer layers formed on both sides of the substrate. FIG. 4 is a side sectional view of a coated article 400 having a substrate 402, a first elastomer layer 404 formed on a first surface 406 of the substrate 402, and a second elastomer layer 408 formed on a second surface 410 of the substrate 402. In some embodiments, the first elastomer layer 404 and the second elastomer layer 408 can have the same thickness, composition, and structure. For example, in some embodiments, the first and second elastomer layers 404, 408 can both be formed from an un-foamed elastomer material and can have substantially the same thickness. In other embodiments, the first and second elastomer layers 404, 408 can both be formed from a foamed elastomer material. In still other embodiments, however, the first and second elastomer layers 404, 408 can have different thicknesses, compositions, and/or structures. For example, in some embodiments, while both layers 404, 408 can be un-foamed elastomers, the first elastomer layer 404 can be thicker than the second elastomer layer 408. In other embodiments, the first elastomer layer 404 can be formed from a foamed elastomer material while the second elastomer layer 408 is formed from an un-foamed elastomer material. In general, the thickness, composition, and structure of the first and second elastomer layers 404, 408 can be selected based on the specific application in which the coated article 400 is intended to be used.

Figure 5:
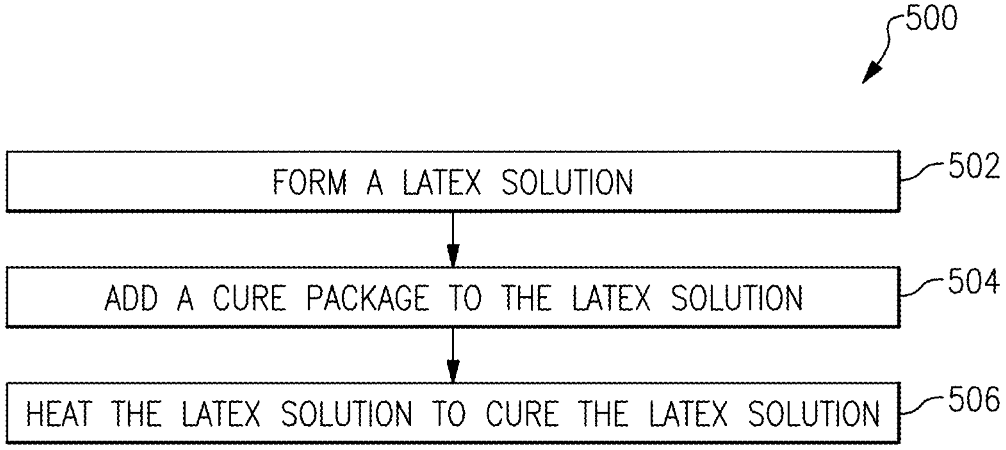
FIG. 5 is a flowchart illustrating a method of forming an elastomer material, according to embodiments of the present technology.

FIG. 5 is a flowchart illustrating a process 500 for forming an elastomer material. At step 502, a latex solution is formed. The latex solution comprises water, ethylene glycol monobutyl ether ($BuOC_2H_4OH$, also referred to herein as glycol ether EB), a rheology modifier, a dispersing agent, a wetting agent, a reinforcing filler material, a de-foaming agent, and latex. The solution is formed using water and glycol ether EB as the medium or solvent. In some embodiments, the reinforcing filler material comprises carbon black. In some embodiments, the latex solution can comprise one or more additional ingredients. For example, in some embodiments, the latex solution also comprises a retarding agent (e.g., salicylic acid), a plasticizing agent (e.g., phthalates, dicarboxylates, phosphates, and fatty esters), a wax (e.g., paraffin wax, polyethylene glycol, polypropylene), an antiozonant (e.g., N'-substituted p-phenylenediamines (including dialkyl p-phenylenediamines, alkyl-aryl p-phenylenediamines, and diaryl p-phenylenediamines), 6-ethox-2,2,4-trimethyl-1,2dihydroquinoline, paraffin wax), and an antioxidant (e.g., phenols, amines, phosphites, thioesters). In embodiments where the elastomer material comprises a foamed elastomer, the latex solution can also include a blowing agent. As described in more detail elsewhere in the specification, each of these optional additional ingredients can be added to modify the properties of the cured elastomer layer and/or the properties of the latex solution prior to curing the latex solution. In some embodiments, the latex solution comprises 5-30 wt. % glycol ether EB, 1-15 wt. % rheology modifier, 0.1-2 wt. % dispersing agent, 0.1-2 wt. % wetting agent, 1-15 wt. % carbon black, 0.1-5 wt. % de-foaming agent, 20-70 wt. % latex suspension, 0-2 wt. % retarding agent, 0-5 wt. % plasticizing agent, 0-5 wt. % wax, 0-2 wt. % antiozonant, 0-2 wt. % antioxidant, and 50-90 wt. % of water. In embodiments where the latex solution comprises a blowing agent, the latex solution comprises 0.1-3 wt. % blowing agent. In some embodiments, the latex solution comprises 30-40 wt. % solids. In some embodiments, pure water is added to the latex solution and the amount of pure water added comprises 18-42 wt. % of the latex solution. In some embodiments, one or more of the other ingredients in the solution also includes water such that, in addition to the pure water added to the latex solution, the latex solution includes additional water from the one or more other ingredients. For example, in some embodiments, the latex is added to the solution via a latex suspension that includes latex compounds suspended in water, and the latex suspension can include up to 57 wt. % water. Accordingly, the total amount of water within the latex solution, including water added separately to the solution and water that is incorporated into other ingredients, can be between 50 and 90 wt. % of the total solution.

At step 504, a cure package is added to the latex solution. As described elsewhere in the specification, the cure package comprises one or more curatives. The curatives are configured to accelerate the curing process by increasing the rate at which the latex polymer chain molecules cross-link with adjacent latex polymer chain molecules. After adding the cure package to the latex solution, the latex solution can be thoroughly mixed to ensure that the curatives are evenly dispersed within the latex solution. In some embodiments, the curatives are added as dry powders and the mixing is performed using either ball mill rolling blade mixing. In some embodiments, the curatives included in the cure package includes one or more of amine-type curing agents, amide-type curing agents, silane-type curing agents, isocyanate-type curing agents, arizidine, mercapto compounds, zinc oxide, sulfur, and zinc diethyldithiocarbamate. By way of specific examples and without limitation, the curatives that can be used in the cure package may include, be derived from, or compounded with any of the following structures:

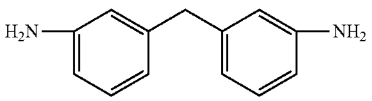

diamino diphenyl methane

-continued

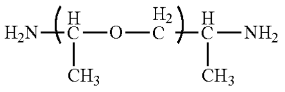

polyetheramine - 5 ≤ n ≤ 30

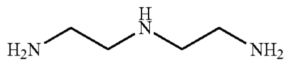

Diethylenetriamine

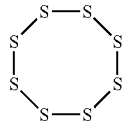

sulfur

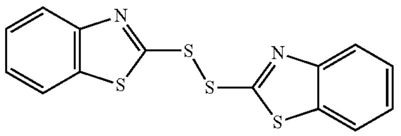

benzothiazyl disulfide

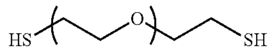

hexa(ethylene glycol)dithiol

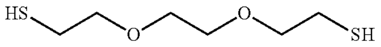

2,2′-(ethylenedioxy)diethanethiol

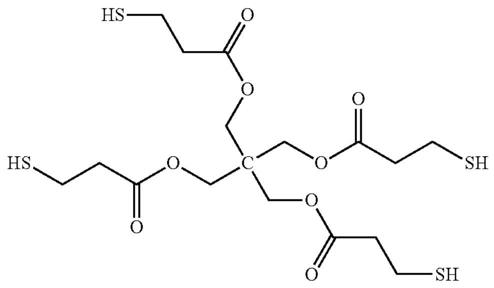

trimethylolpropane tris(3-mercaptopropionate)

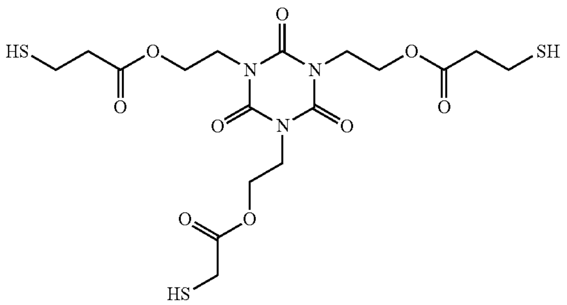

tris[2-(3-mercaptopropionyloxy)ethyl] isocyanurate

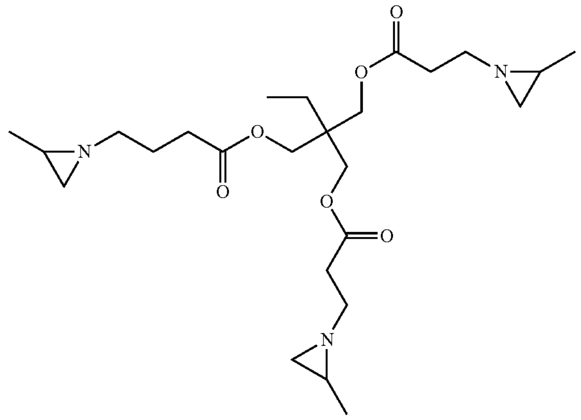

trimethylolpropane tris(2-methyl-1-aziridenepropionate

-continued

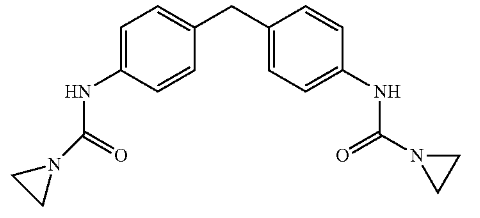

N,N′-(methylenedi-p-phenylene)bis(aziridine-1-carboxamide))

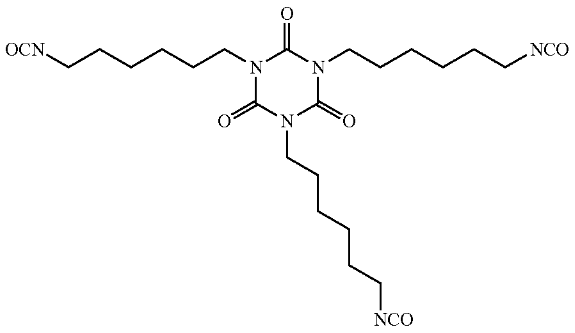

HDI isocyanurate

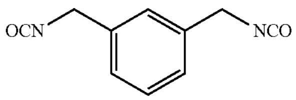

4,4′-methylenebis(phenyl isocyanate)

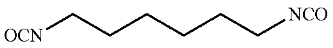

hexamethylene diisocyanate

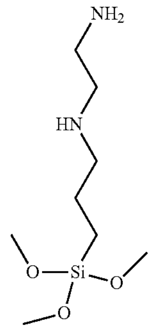

3-(2-aminoethyl)-aminopropyl]trimethoxysilane

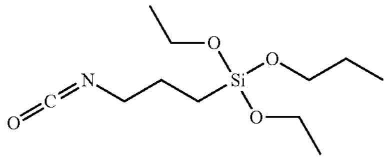

3-isocyanatopropyltriethoxysilane

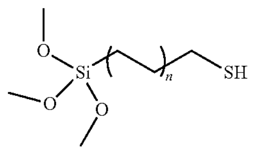

thiol functional methoxy silane - 1 ≤ n ≤ 10

-continued

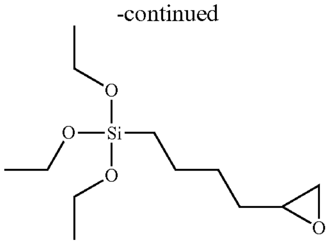

glycidoxypropyltrimethoxysilane

In conventional elastomer curing processes, the curatives may be solvated or mixed with one or more volatile organic compounds (VOCs) including aromatic and aliphatic hydrocarbons that can be harmful to humans and the environment. When present in substantial amounts, such VOCs may be combusted using, e.g., regenerative thermal oxidizers (RTOs) to convert them to less harmful or harmless byproducts such as water. Examples of VOCs used in conventional rubber curing processes include toluene, methyl isobutyl ketone, methyl ethyl ketone, xylene, methanol, acetone, heptane, acetonitrile, iso-butanol, 1-butanol, 2-butanol, isophorone, n-butyl acetate, t-butyl acetate, butyl benzoate, cyclohexane, cyclohexanol, ethanol, ethyl acetate, ethyl benzene, and hexane. However, VOCs can be toxic to humans and can be harmful to the environment. Advantageously, the cure packages used according to embodiments do not employ substantial amounts of VOCs. Accordingly, in some embodiments, the cure package does not include one or more of the above example VOCs, for instance none of the above example VOCs.

At step 506, the latex solution is heated to fully cure the latex solution and form the elastomer material. Heating the latex solution causes the curing process to further accelerate by further increasing the rate at which the latex polymer chain molecules cross-link with adjacent latex polymer chain molecules. In some conventional elastomer curing processes, the curing process can be performed at room temperature and the curing process takes take between 45 minutes and 2 hours to complete, while potentially releasing toxic byproducts, such as isocyanates, toluene diisocyanate, aliphatic ether alcohols, and carbon monoxide. In contrast, advantageously in embodiments of the present technology, the cure package allows for the latex solution to be fully cured by heating the latex solution to a temperature substantially higher than room temperature and for shorter periods of time. Advantageously, the curing does not release substantial amounts of VOCs even at elevated temperatures. For example, in some embodiments, the latex solution is heated to a temperature between 350° F. and 400° F. and kept at that temperature for a length of time between 10 and 30 minutes. In other embodiments, however, the latex solution is fully cured by heating the latex solution to a different elevated temperature for a different amount of time. For example, in some embodiments, the latex solution is heated to a temperature of 250° F., 300° F., 350° F., 400° F., 450° F., 500° F., or a value in a range defined by any of these values, and is kept at that elevated temperature for 5 minutes, 10 minutes, 15 minutes, 20 minutes, 25 minutes, 30 minutes, 35 minutes, 40 minutes, or a value in a range defined by any of these values.

In the previously described embodiments, the latex solution is fully cured by heating the latex solution to a specific temperature and then maintaining that temperature for a specific amount of time. In other embodiments, however, the latex solution can be fully cured using a different heating process. For example, in some embodiments, the latex solution is heated to a first temperature for a first amount of time and then heated to a second temperature for a different amount of time. In other embodiments, the latex solution can be heated such that the temperature continuously increases until the latex solution reaches a maximum temperature.

Figure 6:
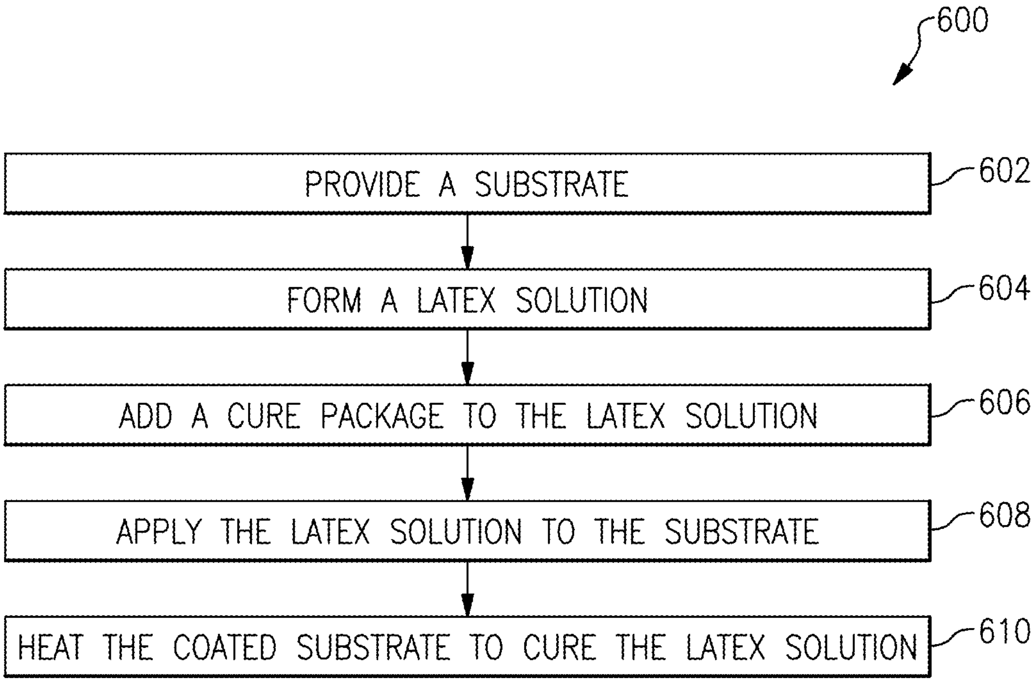
FIG. 6 is a flowchart illustrating a method of forming an elastomer-coated article, according to embodiments of the present technology.

FIG. 6 is a flowchart illustrating a process 600 for forming an elastomer-coated article. At step 602, a substrate is provided. As described above in connection with FIGS. 3 and 4, the substrate can be formed from metal, such as stainless steel, cold rolled steel, galvanized steel, or aluminum, or can be formed from a different material, such as a ceramic, glass, plastic or textile material. The substrate can be configured to provide structure to the elastomer-coated article and to support the cured elastomer layer.

At step 604, a latex solution is formed. As described above in connection with FIG. 5, the latex solution comprises water, glycol ether EB, a rheology modifier, a dispersing agent, a wetting agent, a reinforcing filler material, a de-foaming agent, and latex and, in some embodiments, can also include one or more additional ingredients, including a retarding agent, a plasticizing agent, a wax, an antiozonant, an antioxidant, and/or a blowing agent.

At step 606, a cure package is added to the latex solution. As described above in connection with FIG. 5, the cure package comprises one or more curatives configured to accelerate the curing process. In some embodiments, the cure package comprises zinc oxide, sulfur, zinc diethyldithiocarbamate. In some embodiments, the cure package does not include any VOCs. After adding the cure package to the latex solution, the latex solution can be thoroughly mixed to ensure that the curatives are evenly distributed throughout the latex solution. In some embodiments, after mixing the cure package and the latex solution, the mixed latex solution can have a viscosity between 5000 and 15000 cP.

In some embodiments, the cure package is added to the latex solution immediately after the latex solution is formed. In other embodiments, however, the cure package is not added to the latex solution immediately after the latex solution is formed but is instead added a given amount of time later. The length of time after the latex solution is formed during which the latex solution is still usable and has not substantially degraded is referred to herein as the solution's shelf life. Conventional latex solutions have a shelf life of 1 or 2 days, which means that the curing agent must be added to the latex solution within 1 or 2 days of the latex solution being formed or the latex solution will be too degraded to be used. In contrast, in embodiments of the present technology, the latex solution can advantageously have a shelf life exceeding a week or longer. For example, the latex solution can have a shelf life exceeding 1 week, 2 weeks, 1 month, 2 months, 6 months, 12 months or a duration in a range defined by any of these values. This means that the latex solution can be stored for up to 12 months after the latex solution is formed before the cure package is added. Advantageously, this allows for large batches of the latex solution to be prepared in advance and then stored before the cure package is added to the latex solution, which can decrease manufacturing costs and help to ensure that the latex solution is consistently available, which improves manufacturing efficiency.

At step 608, the latex solution is applied to the substrate to form a layer of the uncured latex solution. The latex solution can be applied to the substrate using any suitable coating method and the layer of uncured latex solution can have any suitable thickness For example, the latex solution can be applied to the substrate using doctor blade coating, roll coating, spray coating, or knife over roll coating methods and the layer can have a thickness 0.01 mm, 0.02 mm, 0.03 mm, 0.04 mm, 0.05 mm, 0.1 mm, 0.2 mm, 0.3 mm, 0.4 mm, 0.5 mm, or a value in a range defined by any of these values. In some embodiments, the thickness of the layer can depend on the viscosity of the latex solution.

In some embodiments, the latex solution is applied to the surface of the substrate immediately after the cure package is mixed into the latex solution. In other embodiments, however, the latex solution is not applied to the surface of the substrate immediately after the cure package is mixed into the latex solution but is instead applied to the substrate a given amount of time later. However, if too much time elapses between the cure package being added to the latex solution and the latex solution being applied to the substrate, the latex solution can start to cure and become too thick and/or hard to be evenly and consistently applied to the substrate. The length of time after the cure package has been mixed into the latex solution where the viscosity of the latex solution is sufficiently low that it can still be effectively applied to the substrate surface is referred to herein as the solution's pot life. In some embodiments, the latex solution can be effectively applied to the substrate when it has a viscosity less than 15000 cP because latex solutions having a viscosity greater than 15000 cP can be too thick to be evenly and consistently applied to the substrate. The pot life of conventional latex solutions depends on the specific chemistries of the latex solutions and the cure package being used, but is often less than 3 or 4 hours and can even be 30 minutes or less. In contrast, in embodiments of the present technology, the latex solution can advantageously have a pot life exceeding 1 hour, 2 hours, 12 hours, 1 day, 2 days, 1 week, 2 weeks, or a duration in a range defined by any of these values. This means that the latex solution can still be effectively applied to the surface of the substrate within 2 weeks of the cure package being mixed into the latex solution. Advantageously, a pot life of up to 2 weeks allows for larger batches of the latex solution to be prepared in advance and then stored before being applied to the substrate, which can decrease manufacturing costs and help to ensure that the mixed latex solution is consistently available, which improves manufacturing efficiency.

In the illustrated embodiment, the latex solution is applied to the surface of the substrate without preparing the surface of the substrate. In other embodiments, however, the surface of the substrate is treated before the latex solution is applied. For example, in some embodiments, a pretreatment solution is applied to the surface of the substrate. The pretreatment solution is configured to modify the surface of the substrate to increase the strength of the bond between the elastomer layer and the substrate surface.

In the illustrated embodiment, the latex solution is applied directly to the surface of the substrate. In other embodiments, however, one or more additional layers can be formed on the surface of the substrate before the latex solution is applied. For example, in some embodiments, one or more additional elastomer layers is formed on the surface of the substrate before the latex solution is applied to the substrate. In some embodiments, the one or more additional elastomer layers can be configured to improve the vibration and noise damping abilities of the elastomer-coated article.

At step 610, the coated substrate is heated to cure the latex solution and form the elastomer layer. As described above in connection with FIG. 5, heating the latex solution causes the curing process to further accelerate by further increasing the rate at which the latex polymer molecules cross-link with adjacent latex polymer molecules. In conventional elastomer curing processes, the curing process is performed at room temperature and the curing process takes between 45 minutes and 2 hours to complete. In contrast, in embodiments of the present technology, the coated substrate is heated to a temperature between 350° F. and 400° F. and kept at that temperature for a length of time between 10 and 30 minutes. Advantageously, heating the coated substrate to cure the latex increases the rate at which the elastomer-coated article is produced and allows for more control over the curing process.

The coated substrate can be heated using any suitable heating system. In some embodiments, the coated substrate is heated using a microwave oven. In other embodiments, the coated substrate is heated using a hot air oven.

As previously described, in some embodiments, the coated elastomer comprises a foamed elastomer material. The foamed elastomer material can be formed from a latex solution having a blowing agent mixed into it. During the curing and heating process of the latex solution, the blowing agent decomposes once the latex solution is heated to a certain temperature. As it decomposes, the blowing agent releases a gas (e.g., carbon dioxide) and the partially-cured latex material traps at least some of this gas. The internal pressure caused by the released gas causes the latex material to stretch and causes the thickness of the elastomer layer to expand. As the latex material continues to cure, the material becomes stronger and eventually becomes stronger than the pressure exerted by the released gas. In these embodiments, the blowing agent can be selected such the decomposition temperature of the blowing agent is the same as, or slightly less than, the curing temperature of the latex solution. Advantageously, selecting a blowing agent that decomposes at or near the curing temperature of the latex solution ensures that the latex material is at least partially-cured when the blowing agent decomposes ensures that the latex material is sufficiently strong enough to maintain the foamed structure when the gas is released but is not too tough and strong for the released gas to cause the latex material to stretch and form a foam structure.

Figure 7:
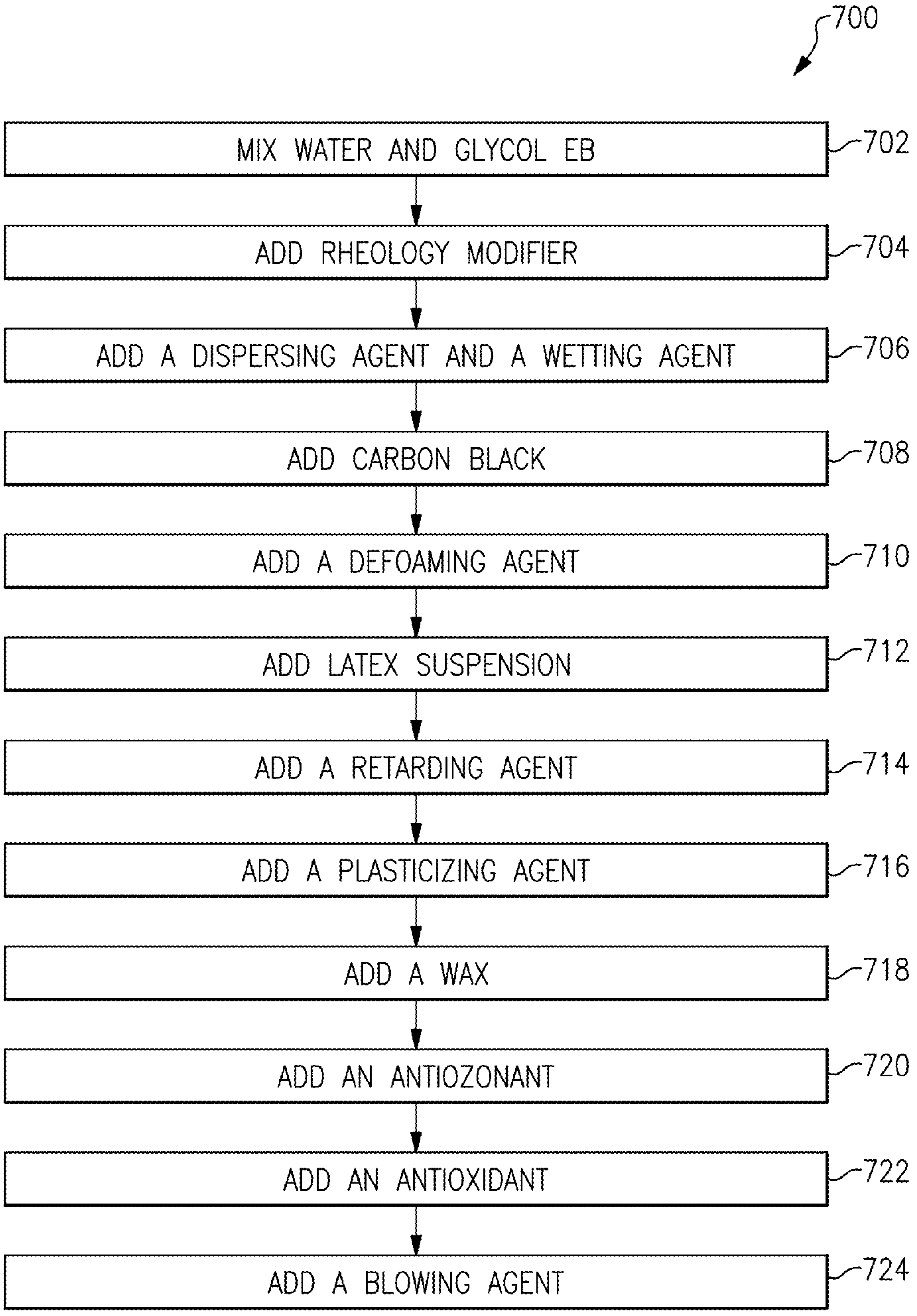
FIG. 7 is a flowchart illustrating a method of forming a latex solution according to embodiments of the present technology.

FIG. 7 is a flowchart illustrating a process 700 for forming a latex solution. At step 702, water and glycol ether EB are added together and then mixed to form a medium. Glycol ether EB is a water-soluble solvent and has both polar and non-polar ends, which allows it to dissolve both polar and non-polar substances. Accordingly, the glycol ether EB is helpful in dissolving the other components that form the latex solution. The ratio of water to glycol ether EB can be manipulated to form the medium or solvent, which in turn can affect various properties of the latex solution, including the viscosity, percentage solids, filler incorporation, and component solubility. According to embodiments, prior to adding various solid components, the medium or solvent can contain water in the amount greater than 50 wt. %, 60 wt. %, 70 wt. %, 80 wt. %, 90 wt. % or a value in range defined by any of these values. In some embodiments, the water and glycol ether EB are mixed at 800-1500 RPM until the water and glycol ether EB are evenly distributed.

At step 704, a rheology modifier is added. Rheology modifiers are substances that alter the rheology of a material, which relates to a material's tendency to deform and flow in response to a stress or force applied to the material. For fluid materials, rheology is closely related to the fluid's viscosity. Accordingly, the rheology modifier is added to increase the viscosity of the latex solution. As discussed in greater detail elsewhere in the application, the latex solution includes carbon black as a filler material. However, it can be difficult to incorporate carbon black into latex solutions if the viscosity of the latex solution is too low. Accordingly, the rheology modifier is added to increase the viscosity of the latex solution so that carbon black can be more effectively dispersed within the latex solution. In some embodiments, the rheology modifier causes the latex solution to become a non-Newtonian fluid. A non-Newtonian fluid is a material in which viscosity increases with the rate of shear strain in a process known as shear-thickening. The non-Newtonian nature of the latex solution results in the viscosity of the latex solution being even further increased when the carbon black is added to the latex solution, which further improves the dispersal of the carbon black filler material and also prevents the carbon black powder from separating out of solution. The increased viscosity also allows the latex solution to be applied to a substrate in thicker layers, which can increase the thickness of the cured elastomer layer. Additionally, in embodiments where the latex solution includes a blowing agent, the increased viscosity improves the ability of the latex solution to capture gas released by the blowing agent during the curing process, which improves the ability of the latex solution to form a foamed elastomer layer. In some embodiments, the rheology modifier is added slowly to prevent the rheology modifier from clumping. Testing showed that adding the rheology modifier to the solution too quickly prevented the rheology modifier from entering solution and the resulting latex solution could not be coated onto the substrate. Examples of suitable rheology modifiers include phyllosilicate, urea derivatives, modified urea polyurethane, synthetic layered silicates, organo-modified clays, cellulose modified polymers and minerals containing silicone. By way of specific examples and without limitation, the rheology modifiers can include, derived from or compounded with any of the following structures:

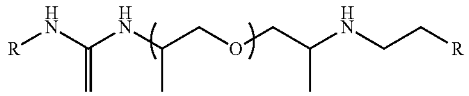

modified Ureas - 1 ≤ n ≤ 20

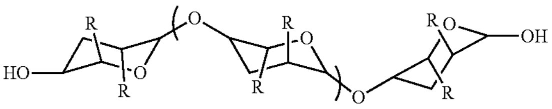

cellulose - 300 ≤ n ≤ 1000;
R = H, $CH_3$, $CH_2CH(OH)CH_3CH_2CH_2OH$

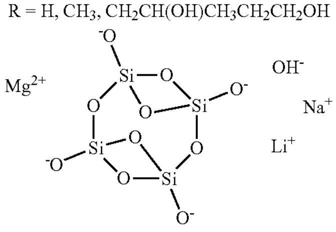

silicates

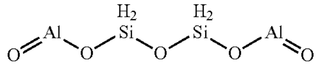

kaolinite

At step 706, a dispersing agent and a wetting agent are added. Dispersing agents are configured to improve the separation of particles within a solution so as to prevent the particles from settling or clumping together. A wetting agent is a surface-active molecule that reduces the surface tension of water and improves the ability of particles to be dispersed within the water. Together, the dispersing agent and the wetting agent prevent the carbon black particles from clumping together and improves the ability of the carbon black particles to be dispersed within the solution. In some embodiments, the dispersing agent and wetting agent are added while the solution is being mixed to ensure that the dispersing agent and wetting agent are evenly dispersed within the solution. In some embodiments, the dispersing agent and the wetting agent are added simultaneously. In other embodiments, however, the wetting agent is added after the dispersing agent is added. Examples of suitable dispersing agents include alkyl ammonium salts, modified polyurethanes, modified styrene maleic acid copolymers, styrene maleic anhydride copolymers, acrylic copolymers, hydroxyl-functional carboxylic acid ester, polyamine amides of unsaturated polycarboxylic acids, copolymer with pigment-affinic groups, modified carboxyl functional polyglycol copolymer, high molecular weight block copolymer. By way of specific examples and without limitation, the suitable wetting agents that can be used include, derived from or compounded with any of the following structures:

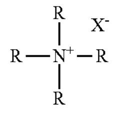

alkyl ammonium salts -
R = short or long chain alkyl groups,
H; X = $Cl^-$, $F^-$, $I^-$

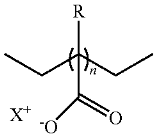

carboxylic salts - R = $CH_3$, H; X = $Na^+$, $K^+$

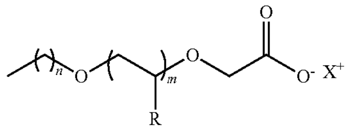

$1 \leq n \leq 15$; $1 \leq m \leq 15$

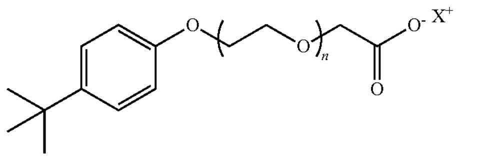

glycolic Acid Ethoxylate 4-terbutylphenol ether - $1 \leq n \leq 15$

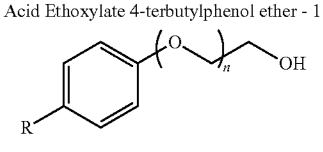

Triton 100X - $1 \leq n \leq 15$

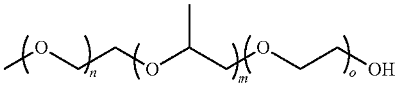

Poly(ethylene glycol)-block-(poly(propylene glycol)-block-poly(ethylene glycol) - $1 \leq n \leq 15$; $1 \leq m \leq 15$; $1 \leq o \leq 15$ At step 708, carbon black is added. The carbon black functions as a reinforcing filler material for the cured elastomer. Filler materials in elastomers are relatively inert materials that are added to strengthen the elastomer, as well as increase the stiffness, tensile strength, and abrasion resistance. As a filler material, carbon black is affordable and readily wets into the polymer matrix. Carbon black also provides additional elasticity to the elastomer layer. In some embodiments, the carbon black is added to the mixture slowly while the mixture is being mixed. As the carbon black is added, the speed of the mixer is steadily ramped up to 1200-2200 RPM. In some embodiments, after the carbon black is added, the solution is mixed with a high shear rate for 30 minutes to ensure that the carbon black powders are evenly distributed and dispersed within the liquid. Examples of suitable grades of carbon black additives include ASTM N990, ASTM N762, and ASTM N330.

At step 710, a defoaming agent is added. Defoaming agents are configured to allow air within the solution to be released and to weaken the walls of air bubbles within the solution. Accordingly, the defoaming agent is added to the solution to eliminate (or at least reduce) air bubbles within the liquid solution during the latex mixing and coating process. The amount of defoaming agent added may be dependent on the intended use of the elastomer material. Examples of suitable defoaming agents include polyether-modified polydimethylsiloxane, hydrophobic solids and foam destroying polymers, polysiloxane and hydrophobic solids, paraffinic mineral oils, polyether-modified polydimethylsiloxane, silicone, silicone free powders and silicone powder defoamers. By way of specific examples and without limitation, suitable defoaming agents that can be used can include, derived from, or compounded with any of the following structures:

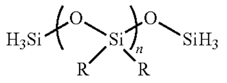

silicone based - $1 \leq n \leq 20$;
R = H, $CH_3$, Phenol

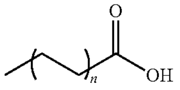

fatty acids - $1 \leq n \leq 20$

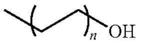

fatty alcohols - $1 \leq n \leq 20$

At step 712, a latex suspension is added. Some latex suspensions comprise an emulsion of polymer chains in water. In some embodiments, the latex suspension contains >50 wt. %, for instance 57 wt. % water. In some embodiments, the latex suspension comprises hydrogenated nitrile butadiene rubber (HNBR) compounds. HNBR has excellent chemical resistance to many chemicals, including most automotive fluids, and maintains its physical characteristics at elevated temperatures. However, the use of HNBR is merely an example and, in other embodiments, other latex solutions can be used. For example, in some embodiments, the latex suspension can comprise ethylene propylene diene monomer rubber (EPDM), nitrile butadiene rubber (NBR), fluoroelastomers (FKM), or even isoprene. In general, any latex suspension that is configured to have high chemical resistance to automotive fluids when cured and to maintain its physical strength and damping ability when vulcanized can be used. Examples of suitable latex compounds include carboxylated NBR, FKM, EPDM latex, and HNBR latex.

The latex suspension is added after the carbon black is added to ensure that the carbon black is fully dispersed in the solution before the latex suspension is added. As previously described, the carbon black is mixed at high speeds (e.g., 1200-2200 RPM) to ensure that the carbon is evenly distributed and dispersed within the solution. However, mixing the latex suspension at too high of speeds can disturb the latex micelles within the latex suspension. Accordingly, to ensure that the latex micelles in the latex solution are not disturbed during the mixing process, the latex suspension is slowly added to the solution at low mixing speeds. For example, in some embodiments, the latex suspension is mixed at 400-800 RPM. Testing has shown that adding the latex suspension before the carbon black causes the solution to coagulate because the carbon black was not mixed at a sufficiently high speed to fully incorporate and be dispersed within the solution. The coagulated solution cannot be coated onto the substrate.

In the illustrated embodiment, the latex solution is added after the defoaming agent is added. In other embodiments, however, the latex solution is added before the defoaming agent.

In some embodiments, the latex solution is complete after the latex suspension is added. In other embodiments, however, one or more additional components can be added to the latex solution after the latex suspension is added. These additional components can be configured to improve the processability of the latex solution and/or the properties of the resulting elastomer layer.

At step 714, in some embodiments, a retarding agent is added. Retarding agents function as vulcanization inhibitors and prevent the latex solution from vulcanizing prematurely so that the latex solution remains fluid for longer periods of time. This can improve the processability of the latex solution as it ensures that the latex does not begin to cure and vulcanize before the latex solution is applied to the substrate. An example of a suitable retarding agent include retarder sax (90% salicylic acid/10% light paraffinic oil).

At step 716, in some embodiments, a plasticizing agent is added. Plasticizing agents are added to another material to make that material softer or more pliable. Accordingly, in some embodiments, the plasticizing agent is added to increase the pliability of the resulting elastomer material. Examples of suitable plasticizing agents include phthalates, dicarboxylates, phosphates, and fatty acid esters.

At step 718, in some embodiments, a wax is added. The wax is configured to help the elastomer layer formed from the latex solution maintain its flexibility over a wide temperature range. In some embodiments, multiple waxes are added. Examples of suitable waxes include phthalates, polyethylene glycol waxes, and polypropylene waxes. By way of specific examples and without limitation, the waxes that can be used can include, derived from or compounded with any of the following structures:

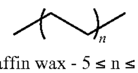

paraffin wax - 5 ≤ n ≤ 20

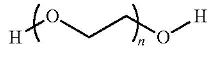

polyethylene glycol - 5 ≤ n ≤ 20

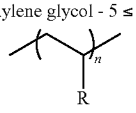

polypropylene - 5 ≤ n ≤ 20;
$R = CH_3$

At step 720, in some embodiments, an antiozonant is added. Antiozonants are configured to prevent or retard damage to elastomer materials by ozone. Unsaturated double bonds within elastomers can react with ozone in the air, causing the polymer chains to break and degrading the mechanical properties of the material. Accordingly, in some embodiments, antiozonants are added to the latex solution to prevent the elastomer material from degrading due to ozone. Examples of suitable antiozonants include thioesters, dialkyl paraphenylene diamines (PPDs), alkyl-aryl PPDs, diaryl PPD, N'-substituted p-phenylenediamines, 6-ethox-2,2,4-trimethyl-1,2dihydroquinoline, and/or paraffin waxes. By way of specific examples and without limitation, the antiozonants that can be used can include, be derived from, or be compounded with any of the following structures:

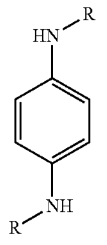

p-phenylenediamine -
R = H, phenyl, hexyl, or short and long chain alkyls

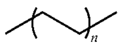

paraffin wax - 5 ≤ n ≤ 20

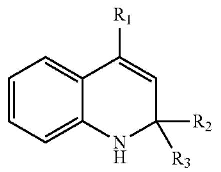

cihydroquinoline - $R_1$, $R_2$, $R_3$ = short and long chain alkyls, phenyl, hydrogen, and/or methoxy groups At step 722, in some embodiments, an antioxidant is added. In rubber systems, antioxidants are configured to delay the aging of polymer compounds and prolong the service life of rubber products by inhibiting oxidation, heat, or light radiation. Examples of suitable antioxidants include pentaerythritol tetrakis [3-[3,5-di-tert-butyl-4-hydroxyphenyl]propionate), and amines. By way of specific examples and without limitation, the antioxidants that can be used can include, be derived from, or be compounded with any of the following structures:

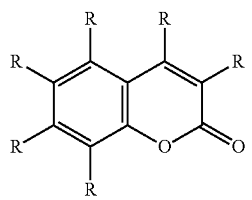

coumarins - R = Cl or $CH_3$

-continued

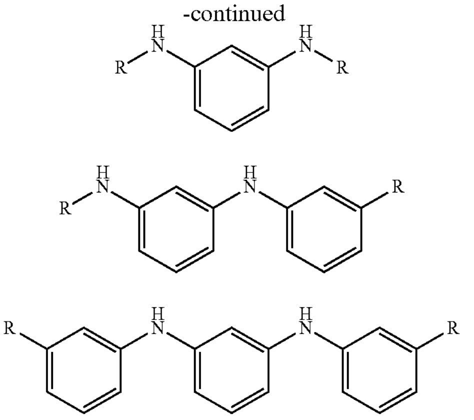

N.N'-dialkyl-p-phenylenediamines

Referring back to FIGS. 5-7, under some circumstances, the sequence of steps as shown as well as various experimental parameter associated with each can be critical. In the following, without limitation, Experimental Examples show experimental conditions that resulted in batches of latex solutions that did meet performance requirements, while Comparative Experimental Examples show experimental conditions that resulted in batches of latex solutions that did not meet the performance requirements, illustrating the criticality of some of the steps and/or experimental parameters.

EXPERIMENTAL EXAMPLES

Several test batches of latex solution were created. Table 1 shows the compositions of one of the successful test batches.

TABLE 1

SUCCESSFUL BATCH #1

| Component | Weight (g) | Weight % |
|---|---|---|
| Water | 385 ± 10% | 30.9 ± 10% |
| Glycol Ether EB | 165 ± 10% | 13.2 ± 10% |
| Rheology Modifier | 63 ± 10% | 5.1 ± 10% |
| Dispersing Agent | 8.25 ± 10% | 0.7 ± 10% |
| Wetting Agent | 9.7 ± 10% | 0.8 ± 10% |
| Carbon Black | 44 ± 10% | 3.5 ± 10% |
| Latex Suspension | 550 ± 10% | 44.1 ± 10% |
| De-foaming Agent | 22 ± 10% | 1.8 ± 10% |
| Total | 1246.95 ± 10% | 100 ± 10% |

After forming the latex solution, a cure package was added to the latex solution. The cure package included 2.83 grams of zinc oxide, 2.83 grams of sulfur, and 0.566 grams of zinc diethyldithiocarbamate. After adding the cure package, the latex solution had a viscosity of 6000-6500 cP and the solution was successfully coated onto a substrate with zero imperfections. The coated substrate was then heated to cure the latex solution and form an elastomer layer. Several tests were then performed on various samples of the coated article.

First, the samples were immersed in various automotive fluids to determine how their weight and thickness changed. The tests were performed according to the test method provided described in ASTM F146. A first sample was immersed in a Ford® Motorcraft® Premium Concentration Antifreeze/Coolant mixed with water in a 50/50 ratio for 100 hours, a second sample was immersed in Dexron III (DEX III) transmission oil for 100 hours, a third sample was immersed in polyalkylene glycol (PAG) oil for 5 hours, and a fourth sample was immersed in IRM 903 reference oil for 5 hours. The sample that was immersed in the 50/50 LLC had a weight change of 0.29% and a thickness change of 1.93%. The sample that was immersed in the DEX III oil had a weight change of 0.56% and a thickness change of 3.77%. The sample that was immersed in the PAG oil had a weight change of 0.26% and a thickness change of 1.89%. The sample that was immersed in the IRM 903 oil had a weight change of 0.38% and a thickness change of 0.62%.

Second, a stub pull adhesion test was performed according to ASTM D4541 to determine the pull-off strength of the elastomer layer. Initial tests of the samples resulted in a pull-off strength of 4.22 MPa and 4.0 MPa. Samples were then heat aged and/or immersed in various oils. One sample was heat aged at 150° C. for 504 hours. After heat aging, the elastomer layer coated on the top of the substrate had a pull-off strength of 1.96 MPa while the elastomer layer coated on the bottom of the substrate had a pull-off strength of 2.82 MPa. A second sample was immersed in Prestone® oil for 336 hours at 130° C. This sample had a pull-off strength of 3.93 MPa. A third sample was immersed in Dexos® oil for 168 hours at 150° C. This sample had a pull-off strength of 4.36 MPa. A fourth sample was immersed in DEX VI oil for 1008 hours at 150° C. This sample had a pull-off strength of 3.38 MPa.

Third, compression and recovery tests were performed according to ASTM F36-15. In this test, a force is applied to compress the elastomer layer and the amount that the layer compresses is recorded. The force is then removed from the elastomer layer and the amount that the elastomer layer recovers is recorded. An initial test showed that the sample compressed by 4.55% and that 65.5% of the deformation recovered shortly after the force was removed. A second sample was first heated to 150° C. for 100 hours before being tested. This sample compressed by 9.2% and 59.6% of the deformation recovered shortly after the force was removed.

Finally, bend tests were performed to see whether the elastomer layer peeled or cracked after being heat aged and/or immersed in a fluid. An initial sample that was only exposed to ambient conditions and not exposed to heat or a fluid showed no signs of peeling or cracking. A second sample was immersed in IRM oil for 500 hours at 150° C. and similarly showed no signs of peeling or cracking when bent. A third sample was immersed in 50/50 LLC for 500 hours and similarly showed no signs of peeling or cracking. A fourth sample was heat aged for 500 hours at 120° C. and also showed no signs of peeling or cracking.

A second successful test batch was also created and then coated onto a substrate. Table 2 shows the compositions of the second successful test batch.

TABLE 2

SUCCESSFUL BATCH #2

| Component | Weight (g) | Weight % |
|---|---|---|
| Water | 300 ± 10% | 27.8 ± 10% |
| Glycol Ether EB | 150 ± 10% | 13.9 ± 10% |
| Rheology Modifier | 57.5 ± 10% | 5.3 ± 10% |
| Dispersing Agent | 7.5 ± 10% | 0.7 ± 10% |
| Wetting Agent | 7.5 ± 10% | 0.7 ± 10% |
| Carbon Black | 37.5 ± 10% | 3.5 ± 10% |
| De-foaming Agent | 5 ± 10% | 0.5 ± 10% |

TABLE 2-continued

| SUCCESSFUL BATCH #2 | | |
|---|---|---|
| Component | Weight (g) | Weight % |
| Latex Suspension | 500 ± 10% | 46.3 ± 10% |
| Wax | 1.6 ± 10% | 0.1 ± 10% |
| Wax | 11.25 ± 10% | 1.0 ± 10% |
| Antioxidant | 1.5 ± 10% | 0.1 ± 10% |
| Total | 1079.35 ± 10% | 100 ± 10% |

After forming the latex solution, a cure package was added to the latex solution. The cure package included 2.57 grams of zinc oxide, 2.57 grams of sulfur, and 0.515 grams of zinc diethyldithiocarbamate. After adding the cure package, the latex solution had a viscosity of 8000-8500 cP and the solution was successfully coated onto a substrate with zero imperfections. The coated substrate was then heated to cure the latex solution and form an elastomer layer. The same set of tests were then performed on various samples taken from the second successful test batch.

In the first test, the samples were immersed in various automotive fluids to determine how their weight and thickness changed. The sample that was immersed in the 50/50 LLC for 100 hours had a weight change of 0.88% and a thickness change of 2.70%. The sample that was immersed in the DEX III oil for 100 hours had a weight change of 0.49% and a thickness change of 2.39%. The sample that was immersed in the PAG oil for 5 hours had a weight change of 0.0.27% and a thickness change of 1.77%. The sample that was immersed in the IRM oil for 5 hours had a weight change of 0.37% and a thickness change of 3.00%.

A stub pull adhesion test was then performed on samples taken from the second successful batch. Initial tests showed that the elastomer layer coated on the top of the substrate had a pull-off strength of 4.21 MPa while the elastomer layer coated on the bottom of the substrate had a pull-off strength of 4.16 MPa. The sample that was heat-aged at 150° C. for 504 hours had a pull-off strength of 2.08 MPa for the top elastomer layer and a pull-off strength of 2.07 MPa for the bottom elastomer layer. The sample that was immersed in Prestone® oil for 336 hours at 130° C. had a pull-off strength of 3.18 MPa. The sample that was immersed in Dexos® oil for 168 hours at 150° C. had a pull-off strength of 3.18 MPa. The sample that was immersed in DEX VI oil for 1008 hours at 150° C. had a pull-off strength of 2.65 MPa.

In the bend tests, an initial sample that was only exposed to ambient conditions showed no signs of peeling or cracking upon bending. The sample that was immersed in IRM oil for 500 hours at 150° C. similarly showed no signs of peeling or cracking when bent. The sample that was immersed in 50/50 LLC for 500 hours also showed no signs of peeling or cracking. The sample that was heat aged for 500 hours at 120° C. also showed no signs of peeling or cracking.

Comparative Experimental Examples

Tables 3-6 show the compositions of latex solution batches that did not meet the performance requirements.

TABLE 3

| BATCH #1 | | |
|---|---|---|
| Component | Weight (g) | Weight % |
| Water | 196 ± 10% | 48.8 ± 10% |
| Glycol Ether EB | 60 ± 10% | 14.9 ± 10% |
| Rheology Modifier | 15 ± 10% | 3.7 ± 10% |
| Dispersing Agent | 6 ± 10% | 1.5 ± 10% |
| Wetting Agent | 5 ± 10% | 1.2 ± 10% |
| Latex Suspension | 100 ± 10% | 24.9 ± 10% |
| De-foaming Agent | 5 ± 10% | 1.2 ± 10% |
| Carbon Black | 15 ± 10% | 3.7 ± 10% |
| Total | 402 ± 10% | 100 ± 10% |

In this batch, the rheology modifier was added too fast and did not entirely enter solution. Also, the carbon black was added after the latex solution, which caused the solution to coagulate. Additionally, the amount of latex suspension included in the solution was less than the amount included in the successful batches. The resulting latex solution could not be coated, illustrating that under some circumstances, one or more of the addition rate of rheology modifier, the addition order of carbon black relative to the latex solution and the amount of latex solution can be critical.

TABLE 4

| BATCH #2 | | |
|---|---|---|
| Component | Weight (g) | Weight % |
| Water | 150 ± 10% | 39.4 ± 10% |
| Glycol Ether EB | 70 ± 10% | 18.4 ± 10% |
| Rheology Modifier | 20 ± 10% | 5.2 ± 10% |
| Dispersing Agent | 6 ± 10% | 1.6 ± 10% |
| Wetting Agent | 5 ± 10% | 1.3 ± 10% |
| Latex Suspension | 115 ± 10% | 30.2 ± 10% |
| Carbon Black | 15 ± 10% | 3.9 ± 10% |
| Total | 381 ± 10% | 100 ± 10% |

In this batch, the rheology modifier was again added too fast and did not entirely enter solution. The carbon black was added to solution after the latex solution and then mixed at a high RPM. After 20 minutes of mixing, however, the solution coagulated. Additionally, the dispersing agent included in the solution was less than the amount included in the successful batches. The resulting latex solution could not be coated, illustrating that under some circumstances, one or more of the addition rate of rheology modifier, the addition order of carbon black relative to the latex solution, the mixing rate after adding the latex solution, and the amount of dispersing agent can be critical.

TABLE 5

| BATCH #3 | | |
|---|---|---|
| Component | Weight (g) | Weight % |
| Water | 100 ± 10% | 37.5 ± 10% |
| Glycol Ether EB | 30 ± 10% | 11.3 ± 10% |
| Rheology Modifier | 10 ± 10% | 3.8 ± 10% |
| Dispersing Agent | 4 ± 10% | 1.5 ± 10% |
| Latex Suspension | 115 ± 10% | 43.2 ± 10% |
| Carbon Black | 7.5 ± 10% | 2.8 ± 10% |
| Total | 266.5 ± 10% | 100 ± 10% |

In this batch, the rheology modifier was again added too fast and did not entirely enter solution. The carbon black was added to solution after the latex solution and then mixed at a medium-high RPM. Additionally, the solution did not include a wetting agent. While the solution did not coagulate during mixing and the solution was able to coat the substrate, there were many chunks in the coating and the solution did coagulate 2 days after mixing was finished, illustrating that under some circumstances, one or more of the addition rate of rheology modifier, the addition order of carbon black relative to the latex solution, the mixing rate after adding the latex solution, and the presence and amount of the wetting agent can be critical.

TABLE 6

| BATCH #4 | | |
|---|---|---|
| Component | Weight (g) | Weight % |
| Water | 70 ± 10% | 32.3 ± 10% |
| Glycol Ether EB | 30 ± 10% | 13.8 ± 10% |
| Rheology Modifier | 5 ± 10% | 2.3 ± 10% |
| Dispersing Agent | 1.5 ± 10% | 0.7 ± 10% |
| Wetting Agent | 1.5 ± 10% | 0.7 ± 10% |
| Carbon Black | 8 ± 10% | 3.7 ± 10% |
| Wax | 0.32 ± 10% | 0.1 ± 10% |
| Latex Suspension | 100 ± 10% | 46.1 ± 10% |
| Antioxidant | 0.63 ± 10% | 0.3 ± 10% |
| Total | 216.95 ± 10% | 100 ± 10% |

In this batch, carbon black was added before the latex suspension and the latex suspension was mixed at a lower RPM. However, when the antioxidant was added, many of the compounds crashed out of solution. Additionally, the solution did not include a defoaming agent and the amount of the rheology modifier included in the solution was less than the amount included in the successful batches. The resulting solution could not be coated because the compounds had left solution, illustrating that under some circumstances, one or more of the presence and the amount of the defoaming agent and the rheology modifier can be critical.

TABLE 7

| BATCH #5 | | |
|---|---|---|
| Component | Weight (g) | Weight % |
| Water | 80 ± 10% | 33.8 ± 10% |
| Glycol Ether EB | 30 ± 10% | 12.7 ± 10% |
| Rheology Modifier | 6 ± 10% | 2.5 ± 10% |
| Wax | 0.5 ± 10% | 0.2 ± 10% |
| Dispersing Agent | 1.5 ± 10% | 0.6 ± 10% |
| Wetting Agent | 1.5 ± 10% | 0.6 ± 10% |
| Defoaming Agent | 4 ± 10% | 1.7 ± 10% |
| Carbon Black | 8 ± 10% | 3.4 ± 10% |
| Latex Suspension | 100 ± 10% | 42.3 ± 10% |
| Antioxidant | 0.63 ± 10% | 0.3 ± 10% |
| Plasticizer | 4.5 ± 10% | 1.9 ± 10% |
| Total | 236.63 ± 10% | 100 ± 10% |

In this batch, the solution was able to coat the substrate but the carbon black did not enter solution, so the resulting coating on the substrate was gritty.

Figure 8:
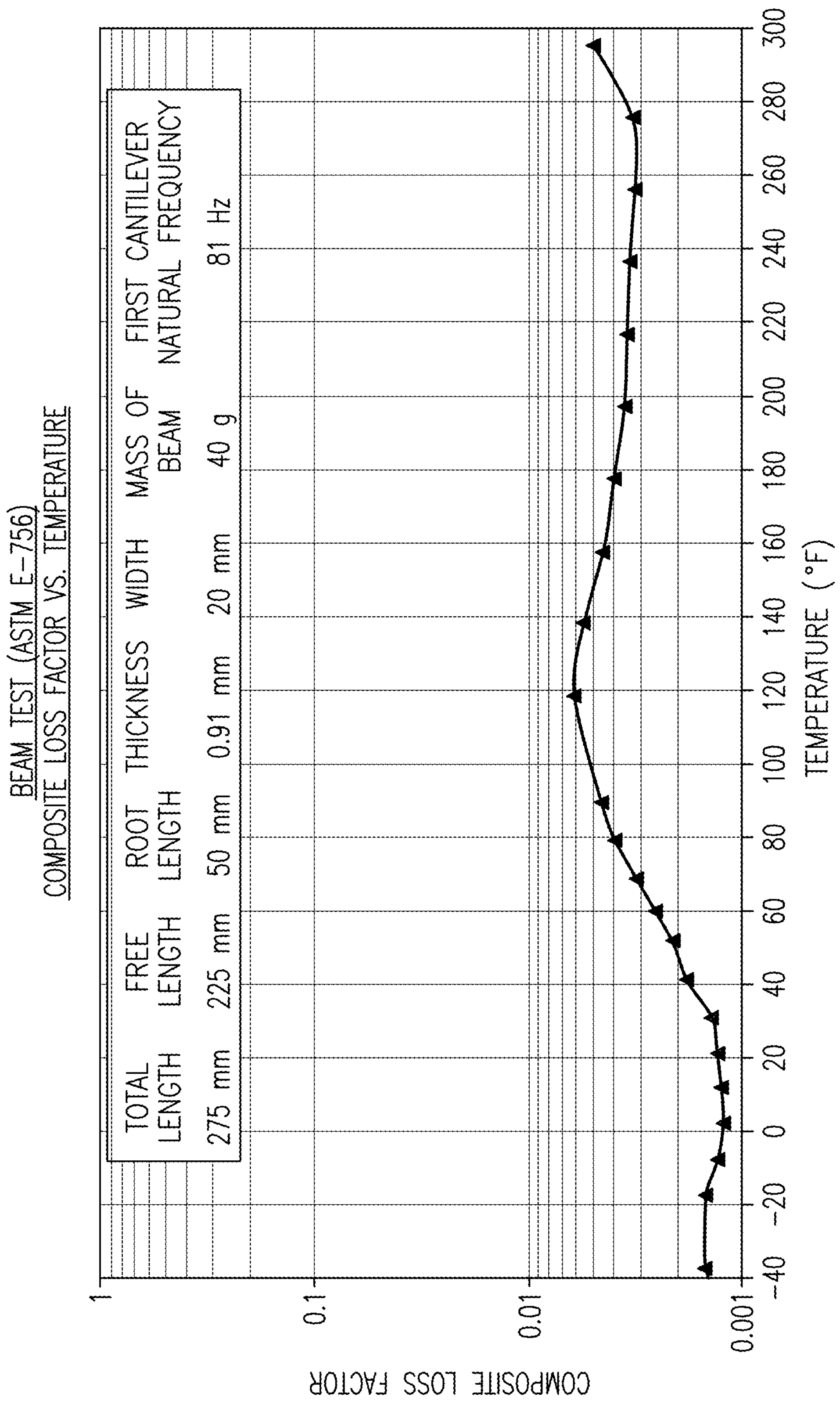
FIG. 8 is a graph showing how the composite loss factor for an elastomer-coated article changes at different temperatures.

As previously described the elastomer layer is configured to be used in automotive applications to provide noise and vibration damping. However, automotive applications are typically performed in a range of temperatures and the elastomer layer must provide sufficient damping when it is within that range of temperatures. To ensure that the elastomer layer provides a satisfactory amount of damping during automotive applications, testing was conducted to determine the loss factor of the coated article at different temperatures. FIG. 8 is a graph of the composite loss factor of a coated article at temperatures ranging from −40° F. to 300° F. The loss factor is a measure of the inherent damping in a material when it is dynamically loaded and the composite loss factor is the loss factor for a composite material, such as an elastomer layer coated onto a substrate. For temperatures below about 40° F., the composite loss factor of the elastomer-coated article remains below 0.002 and does not substantially change. However, once the temperature reaches 40° F., the loss factor increases steadily until it reaches a value of 0.006 at a temperature around 120° F. The loss factor decreases as temperatures continue to increase above 120° F., but the composite loss factor remains above 0.003 for all temperatures greater than 120° F. In fact, the elastomer-coated article has a composite loss factor greater than 0.003 for all temperatures greater than 70° F. This means that the elastomer-coated article is capable of providing substantial noise and vibration damping at temperatures that the article will likely experience during automotive applications.

ADDITIONAL EXAMPLES

1. A method of forming an elastomer, the method comprising:
   - forming a latex solution, comprising:
     - forming a medium by mixing water and ethylene glycol monobutyl ether (glycol ether EB), and,
     - adding to the medium a rheology modifier, a dispersing agent, a wetting agent, a filler material, and a latex suspension, wherein water makes up 50-90 wt. % of the latex solution; and
   - curing the latex solution.
2. The method of example 1, wherein the filler material comprises carbon black.
3. The method of example 1 or 2, wherein the carbon black is added before adding the latex suspension.
4. The method of any one of the above examples, wherein curing the latex solution comprises adding a cure package to the latex solution.
5. The method of any one of the above examples, wherein a viscosity of the latex solution after the cure package is added remains sufficiently low for up to 2 weeks for forming a coating on a substrate.
6. The method of any one of the above examples, wherein the cure package comprises:
   - zinc oxide;
   - sulfur; and
   - zinc diethyldithiocarbamate.
7. The method of any one of the above examples, wherein the cure package does not include a volatile organic compound comprising aliphatic or aromatic hydrocarbons to the latex solution.
8. The method of any one of the above examples wherein the cure package does not include toluene.
9. The method of any one of the above examples, wherein after adding the cure package, the latex solution has a viscosity greater than 5000 cP.
10. The method of any one of the above examples, wherein curing the latex solution comprises:
    - after adding the cure package to the latex solution, heating the latex solution to a temperature between 300° F. and 450° F.

11. The method of any one of the above examples, wherein heating the latex solution to a temperature between 300° F. and 450° F. comprises heating the latex solution for less than an hour.

12. The method of any one of the above examples, wherein heating the latex solution for less than an hour comprises heating the latex solution for between 10 and 30 minutes.

13. The method of any one of the above examples, wherein the latex solution has a pot life of at least 1 day.

14. The method of any one of the above examples, wherein the latex solution has a pot life of at least 1 week.

15. The method of any one of the above examples, wherein the latex solution has a pot life up to 2 weeks.

16. The method of any one of the above examples, wherein forming the latex solution further comprises:
after adding the carbon black but before adding the latex suspension, adding a defoaming agent.

17. The method of any one of the above examples, further comprising:
after adding the latex suspension, adding one or more of a retarding agent, a plasticizing agent, a wax, an antiozonant, and an antioxidant.

18. The method of any one of the above examples, further comprising:
after forming the latex solution, mixing the latex solution for 10 to 24 hours.

19. The method of any one of the above examples, wherein forming the latex solution further comprises:
after adding the carbon black but before adding the latex suspension, mixing for at least 20 minutes.

20. The method of any one of the above examples, wherein the latex solution comprises:
20-70 wt. % latex;
5-30 wt. % glycol ether EB;
1-15 wt. % rheology modifier;
0.1-2 wt. % dispersing agent;
0.1-2 wt. % wetting agent;
1-15 wt. % carbon black; and
50-90 wt. % water.

21. The method of any one of the above examples, wherein forming the latex solution comprises:
after adding the carbon black, adding a defoaming agent.

22. The method of any one of the above examples, wherein the latex solution comprises 0.2-2 wt. % de-foaming agent.

23. The method of any one of the above examples, wherein curing the latex solution does not include adding a volatile organic compound to the latex solution.

24. The method of any one of the above examples wherein curing the latex solution does not include adding toluene, polyisocyanate, a ketone, methanol, acetone, butanol, acetate, or ethanol.

25. The method of any one of the above examples, wherein the method forms the elastomer as a final product without combusting volatile organic compounds from the latex solution.

26. The method of any one of the above examples, wherein water makes up 50-90 wt. % of the medium.

27. A method of forming an elastomer coating, the method comprising:
providing a substrate;
forming a latex solution, the latex solution comprising:
20-70 wt. % latex suspension;
5-30 wt. % glycol ether EB;
1-15 wt. % rheology modifier;
0.1-2 wt. % dispersing agent;
0.1-2 wt. % wetting agent;
1-15 wt. % carbon black; and
50-90 wt. % water;
adding a cure package to the latex solution;
coating the substrate with the latex solution; and
heating the coated substrate to cure the latex solution.

28. The method of example 27, wherein water and glycol ether EB form a medium, wherein water makes up 50-90 wt. % of the medium.

29. The method of example 27 or 28, wherein a viscosity of the latex solution after the cure package is added remains sufficiently low for up to 2 weeks for forming the coating on the substrate.

30. The method of any one of examples 27-29, wherein forming the latex solution comprises:
mixing the water and the glycol ether EB;
after mixing the water and the glycol ether EB, adding the rheology modifier;
after adding the rheology modifier, adding the dispersing agent and the wetting agent;
after adding the dispersing agent and the wetting agent, adding the carbon black; and
after adding the carbon black, adding the latex.

31. The method of any one of examples 27-30, further comprising:
after adding the cure package to the latex solution, waiting least 1 day before coating the substrate with the latex solution.

32. The method of any one of examples 27-31, wherein waiting at least 1 day before coating the substrate with the latex solution comprises waiting at least 1 week before coating the substrate with the latex solution.

33. The method of any one of examples 27-32, wherein the latex solution further comprises one or more of:
greater than 0 and up to 2 wt. % retarding agent;
greater than 0 and up to 5 wt. % plasticizing agent;
greater than 0 and up to 5 wt. % wax;
greater than 0 and up to 2 wt. % antiozonant; and
greater than 0 and up to 2 wt. % antioxidant.

34. The method of any one of examples 27-33, wherein forming the latex solution further comprises:
after adding the latex, adding the retarding agent when present;
after adding the retarding agent, adding the plasticizing agent when present;
after adding the plasticizing agent, adding the wax when present;
after adding the wax, adding the antiozonant when present; and
after adding the antiozonant, adding the antioxidant when present.

35. The method of any one of examples 27-34, wherein the latex solution comprises:
0.1-3.1 wt. % de-foaming agent.

36. The method of any one of examples 27-35, wherein forming the latex solution comprises:
after adding the carbon black but before adding the latex, adding the de-foaming agent.

37. The method of any one of examples 27-36, further comprising:
after forming the latex solution, mixing the latex solution for 10 to 24 hours.

38. The method of any one of examples 27-37, wherein heating the coated substrate comprises heating the coated substrate to a temperature between 300° F. and 450° F.

39. The method of any one of examples 27-38 wherein the latex solution further comprises:

a blowing agent, wherein the blowing agent has a decomposition temperature between 300° F. and 450° F.

40. The method of any one of examples 27-39, wherein, after adding the cure package to the latex solution but before coating the substrate with the latex solution, the latex solution has a viscosity greater than 5000 cP.

41. The method of any one of examples 27-40, wherein the method forms the elastomer coating as a final coating without combusting volatile organic compounds from the latex solution.

42. An apparatus, comprising:

a substrate; and a rubber coating formed on the substrate, wherein the rubber coating comprises:

vulcanized latex; and carbon black.

43. The apparatus of example 42, wherein the apparatus has a composite loss factor greater than 0.003 for temperatures between 70° F. and 240° F.

44. The apparatus of example 42 or 43, wherein the apparatus has a maximum composite loss factor greater 0.006.

45. The apparatus of any one of examples 42-44, wherein the rubber comprises a foamed rubber.

46. The apparatus of any one of examples 42-45, wherein the foamed rubber has a volume percentage of air greater than 75% and a volume percentage of rubber less than 25%.

47. The apparatus of any one of examples 42-46, wherein the foamed rubber has a volume percentage of air greater than 80% and a volume percentage of rubber less than 20%.

48. The apparatus of any one of examples 42-47, wherein the foamed rubber has a thickness between 0.04 mm and 0.5 mm.

49. The apparatus of any one of examples 42-48, wherein the rubber comprises an unfoamed rubber.

50. A method of forming an elastomer, the method comprising:

forming a latex solution, the latex solution comprising:

20-70 wt. % latex suspension;

5-30 wt. % glycol ether EB;

1-15 wt. % rheology modifier;

0.1-2 wt. % dispersing agent;

0.1-2 wt. % wetting agent;

1-15 wt. % carbon black; and 50-90 wt. % water;

adding a cure package to the latex solution, wherein the cure package does not comprise a volatile organic compound; and heating the latex solution to cure the latex solution.

51. The method of example 50, wherein the cure package does not include toluene.

52. The method of example 50 or 51, wherein the latex solution further comprises:

a blowing agent, wherein the blowing agent has a decomposition temperature between 300° F. and 450° F.

53. The method of any one of examples 50-52, wherein heating the latex solution to cure the latex solution comprises heating the latex solution to a temperature between 300° F. and 450° F.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A method of forming an elastomer, the method comprising:

forming a latex solution, comprising:

forming a medium by mixing water and ethylene glycol monobutyl ether (glycol ether EB), and, adding to the medium a rheology modifier, a dispersing agent, a wetting agent, a filler material, a defoaming agent, and a latex suspension, wherein water makes up 50-90 wt. % of the latex solution; and curing the latex solution;

wherein:

the filler material comprises carbon black;

the filler material is added to the medium before adding the latex suspension; and the defoaming agent is added to the medium after adding the filler material but before adding the latex suspension.

2. The method of claim 1, wherein curing the latex solution comprises adding a cure package to the latex solution and wherein the cure package does not include a volatile organic compound.

3. The method of claim 2, wherein a viscosity of the latex solution after the cure package is added remains sufficiently low for up to 2 weeks for forming a coating on a substrate.

4. The method of claim 2, wherein curing the latex solution comprises:

after adding the cure package to the latex solution, heating the latex solution to a temperature between 300° F. and 450° F.

5. The method of claim 4, wherein heating the latex solution to a temperature between 300° F. and 450° F. comprises heating the latex solution for less than an hour.

6. The method of claim 2, wherein the latex solution has a pot life of at least 1 day.

7. The method of claim 6, wherein the latex solution has a pot life up to 2 weeks.

8. The method of claim 1, further comprising:

after adding the latex suspension, adding one or more of a retarding agent, a plasticizing agent, a wax, an antiozonant, and an antioxidant.

9. The method of claim 1, further comprising:

after forming the latex solution, mixing the latex solution for 10 to 24 hours.

10. The method of claim 1, wherein forming the latex solution further comprises:

after adding the carbon black but before adding the latex suspension, mixing for at least 20 minutes.

11. A method of forming an elastomer coating, the method comprising:

providing a substrate;

forming a latex solution, the latex solution comprising:

20-70 wt. % latex suspension;

5-30 wt. % glycol ether EB;

1-15 wt. % rheology modifier;

0.1-2 wt. % dispersing agent;

0.1-2 wt. % wetting agent;

1-15 wt. % carbon black;

0.1-3.1 wt. % de-foaming agent; and 50-90 wt. % water;

adding a cure package to the latex solution;

coating the substrate with the latex solution; and heating the coated substrate to cure the latex solution;

wherein forming the latex solution comprises:

mixing the water and the glycol ether EB;

after mixing the water and the glycol ether EB, adding the rheology modifier;

after adding the rheology modifier, adding the dispersing agent and the wetting agent;

after adding the dispersing agent and the wetting agent, adding the carbon black;

after adding the carbon black, adding the de-foaming agent; and after adding the de-foaming agent, adding the latex suspension.

12. The method of claim 11, wherein water and glycol ether EB form a medium, wherein water makes up 50-90 wt. % of the medium.

13. The method of claim 11, wherein the latex solution further comprises one or more of:

greater than 0 and up to 2 wt. % retarding agent;

greater than 0 and up to 5 wt. % plasticizing agent;

greater than 0 and up to 5 wt. % wax;

greater than 0 and up to 2 wt. % antiozonant; and greater than 0 and up to 2 wt. % antioxidant.

14. The method of claim 11 wherein the latex solution further comprises:

a blowing agent, wherein the blowing agent has a decomposition temperature between 300° F. and 450° F.

* * * * *